(12) United States Patent
Litke et al.

(10) Patent No.: US 9,727,257 B2
(45) Date of Patent: Aug. 8, 2017

(54) MAINTAINING RELATIVE REFERENCES WHEN UNLINKING VOLUMES FROM A VOLUME CHAIN

(71) Applicant: Red Hat, Inc., Raleigh, NC (US)

(72) Inventors: Adam Litke, Bethel Park, PA (US); Federico Simoncelli, Fano (IT)

(73) Assignee: Red Hat, Inc., Raleigh, NC (US)

( * ) Notice: Subject to any disclaimer, the term of this patent is extended or adjusted under 35 U.S.C. 154(b) by 127 days.

(21) Appl. No.: 14/615,375

(22) Filed: Feb. 5, 2015

(65) Prior Publication Data

US 2016/0231951 A1 Aug. 11, 2016

(51) Int. Cl.
*G06F 3/06* (2006.01)
*G06F 9/455* (2006.01)

(52) U.S. Cl.
CPC ............ *G06F 3/0619* (2013.01); *G06F 3/065* (2013.01); *G06F 3/0652* (2013.01); *G06F 3/0664* (2013.01); *G06F 3/0673* (2013.01); *G06F 9/45558* (2013.01); *G06F 2009/45575* (2013.01); *G06F 2009/45579* (2013.01)

(58) Field of Classification Search
CPC ............ G06F 2009/45562; G06F 8/63; G06F 9/45558; G06F 9/45533; G06F 3/065; G06F 3/0619; G06F 2009/45579; G06F 2009/45575; G06F 3/0664; G06F 3/0652; G06F 3/0673; G06F 3/0644
See application file for complete search history.

(56) References Cited

U.S. PATENT DOCUMENTS

| | | | |
|---|---|---|---|
| 8,307,177 B2 | 11/2012 | Prahlad et al. | |
| 8,555,278 B2 | 10/2013 | Janakiraman | |
| 8,677,085 B2 | 3/2014 | Vaghani et al. | |
| 2012/0016840 A1 | 1/2012 | Lin et al. | |
| 2013/0219135 A1* | 8/2013 | Knowles ............. | G06F 9/45558 711/159 |
| 2013/0305002 A1 | 11/2013 | Hallak et al. | |
| 2014/0146055 A1 | 5/2014 | Bala et al. | |
| 2014/0325170 A1* | 10/2014 | Aswathanarayana ...................... | G06F 9/45558 711/162 |

(Continued)

OTHER PUBLICATIONS

Andrews, Joshua, VMware: Repairing orphaned ESX snapshots, SOSTech, Feb. 1, 2011, 7 pages, http://sostechblog.com/2011/02/01/vmware-repairing-orphaned-esx-snapshots, Wordpress.

(Continued)

*Primary Examiner* — Hashem Farrokh
(74) *Attorney, Agent, or Firm* — Lowenstein Sandler LLP

(57) ABSTRACT

A request to delete a snapshot of a virtual machine may be received. The snapshot may be in a volume chain that may include a first storage volume, a second storage volume associated with the snapshot, and a third storage volume. The first storage volume may include a first storage reference. The second storage volume may include a second storage reference. The third storage volume may include a third storage reference relative to the second storage reference. The second storage volume may be merged with the first storage volume preceding the second storage volume in the volume chain. The third storage reference may be updated to be relative to the first storage reference in view of the second storage reference. The snapshot and the second storage volume may be deleted.

17 Claims, 4 Drawing Sheets

(56) References Cited

U.S. PATENT DOCUMENTS

| | | | |
|---|---|---|---|
| 2015/0254007 A1* | 9/2015 | Wood | G06F 3/0619 |
| | | | 711/114 |
| 2015/0378636 A1* | 12/2015 | Yadav | G06F 3/0626 |
| | | | 711/165 |
| 2016/0103738 A1* | 4/2016 | Forgette | G06F 17/30088 |
| | | | 707/639 |

OTHER PUBLICATIONS

Litke, Adam, Thanks for Live Snapshots, Where's Live Merge?, oVirt, Oct. 16, 2014, PowerPoint Presentation, KVM Forum, 42 pages.

\* cited by examiner

MAINTAINING RELATIVE REFERENCES WHEN UNLINKING VOLUMES FROM A VOLUME CHAIN

TECHNICAL FIELD

Embodiments of the present disclosure relate to virtual machines, and more specifically to maintaining relative references when unlinking volumes from a volume chain.

BACKGROUND

A virtual machine (VM) may be a software-based emulation of computer hardware. For example, the VM may operate based on computer architecture and functions of computer hardware resources associated with hard disks or other such memory. A virtual disk that emulates a hard disk or memory may be used by the VM. Thus, the VM may emulate a physical computing environment, and requests for a hard disk or memory may be managed by a virtualization layer which translates these requests to the underlying physical computing hardware resources. The virtualization layer may be part of a virtual machine management application that manages the virtual disk.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
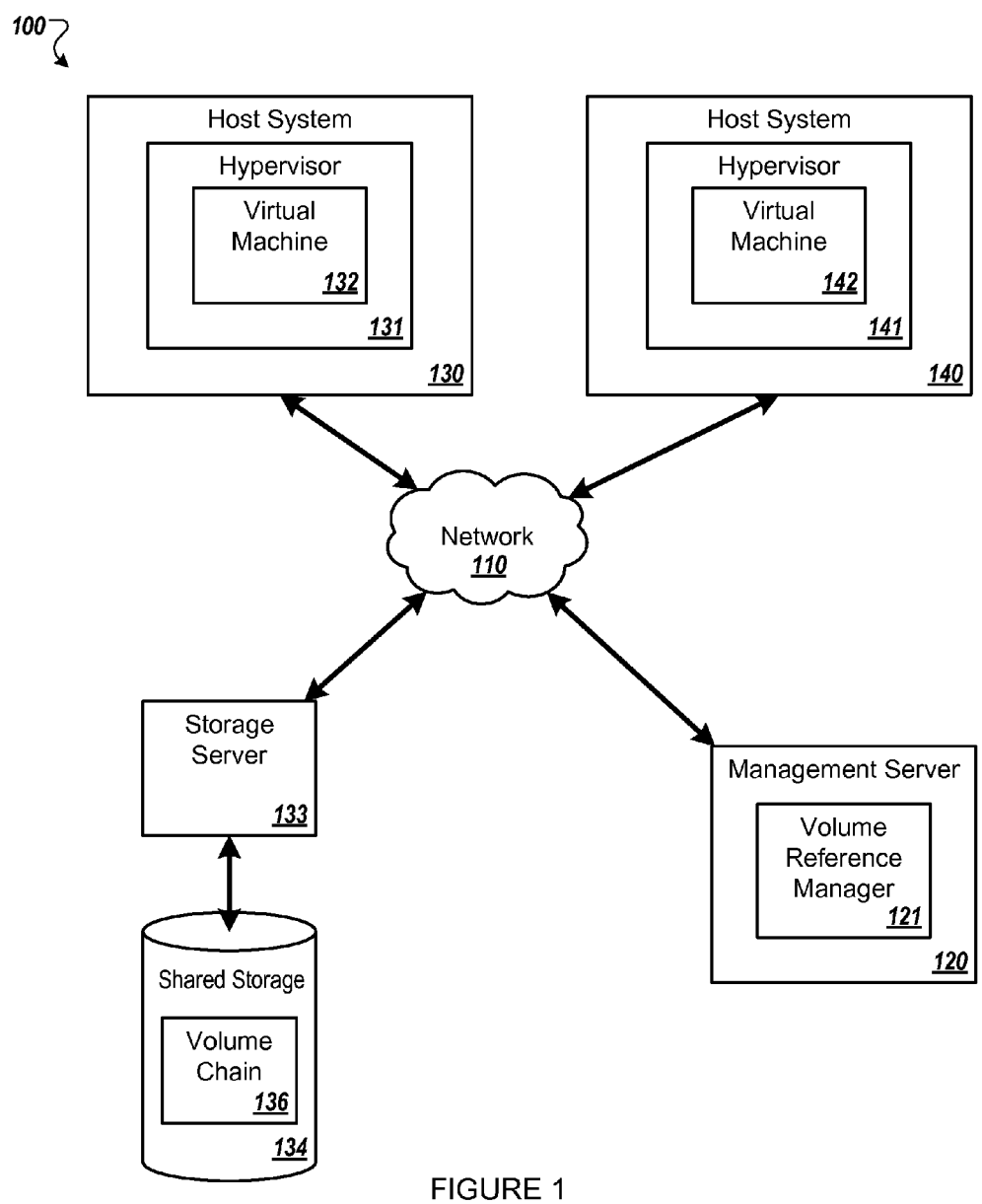
FIG. 1 illustrates an example system architecture in which embodiments of the disclosure may operate.

Aspects of the present disclosure relate to maintaining relative references when unlinking volumes from a volume chain of a virtual machine. The virtual machine (VM) may be based on a virtual disk (also referred to as a virtual disk image) that is based on a series of snapshots. A snapshot may refer to a copy of the virtual disk at a particular point in time. For example, when a change is made to the virtual disk after the snapshot has been created, the snapshot may include a copy of the changed area of the virtual disk as it was prior to the change so that a prior state of the virtual disk may be reconstructed (e.g., by discarding only the changes made after the snapshot was created).

The virtual disk may be based on a series of snapshots. For example, a first snapshot may be created based on the virtual disk and subsequent changes to the virtual disk may be recorded. A second snapshot may be based on the first snapshot, and subsequent changes to the first snapshot may then be recorded in the second snapshot. Further, a third snapshot may then be based on the second snapshot, and subsequent changes to the second snapshot may be saved in the third snapshot. Thus, the virtual disk may be based on a series of the original virtual disk, the first snapshot, the second snapshot, and the third snapshot. Each snapshot and the contents of the original virtual disk may each be stored on separate volumes and the virtual disk may be based on the series or chain of the volumes. Such a series of volumes may be referred to as a volume chain. The final or last volume of the chain may be used to store current changes that are made to the virtual disk by the virtual machine since the last snapshot was created. The last volume may be referred to as the active volume.

Each volume in the volume chain may include a reference (e.g., link, path) to a physical storage. To unlink a volume (e.g., if a volume is to be removed from the volume chain because a snapshot associated with the volume has been deleted) in the volume chain, the remaining volumes should still have a valid path to the storage after the volume to be unlinked is removed. In the context of a shared storage environment where multiple hosts may access the same storage resources, each volume in the volume chain may include relative references as opposed to an absolute reference. An absolute reference typically refers to a file path that includes a root directory and all subdirectories that include a file or folder. An example of an absolute reference for a volume B managed by the Linux© operating system may be represented as "/home/directory/volumes/volume_B.img." A relative reference typically refers to a portion of an absolute reference. An example of a relative reference for a volume B managed by the Linux© operating system may be represented as "/volumes/volume_B.img," which is a portion of the example absolute reference described above.

Typically, when a volume is to be removed from the volume chain, the reference of a child of the removed volume is set to have an absolute reference, even if the reference prior to the removal of the volume was a relative reference. For example, a volume chain can include volumes A, B and C and volume B is to be removed from the volume chain. Volume C is a child of volume B because volume C includes a snapshot that was created based on a snapshot of volume B. When removing volume B from the volume chain, the reference for volume C needs to be updated because the reference of volume C relies on volume B but volume B is no longer part of the volume chain. It may be problematic, however, to create an absolute reference for volume C because an absolute reference is typically specific to a host machine. In other words, using an absolute path can cause problems with the VM when the host machine changes location (e.g., after a VM migration, or if a VM is powered off and restarted on a different host) or when the shared storage is made available via a different path (e.g., on the same host using a different path). In such cases, the VM may be unusable because the absolute reference may not point to the current storage of the VM.

Aspects of the present disclosure address these and other shortcomings by maintaining relative references when unlinking volumes from a volume chain. Using the same example above where volumes A, B and C are linked in a volume chain, when removing volume B, the reference of volume C can be defined as a relative reference to the reference of volume A. For example, volume A can reside in a directory with a path of "/volumes/volume_A/volume_A.img." Volume C can reside in the same volume directory but in a different folder. The relative reference for volume C can thus be represented as " . . . /volume_C/ volume_C.img," where the " . . . " indicates one directory level up from a directory level of the parent reference (e.g., the reference for volume A). By maintaining a relative reference for volume C after removing volume B, the VM can be instantiated on any host. Moreover, when a root or base volume (e.g., original virtual disk) has an absolute reference and all other volumes in the volume chain have relative references, the absolute reference for the root or base volume may change without negatively affecting the VM's use of the volumes in the volume chain.

FIG. 1 is an example system architecture 100 for various implementations of the disclosure. The system architecture 100 may include host systems 130 and 140 coupled to one or more storage servers 133 via a network 110. The network 110 may be a public network (e.g., the Internet), a private network (e.g., a local area network (LAN) or wide area network (WAN)), or a combination thereof. Network 110 may include a wireless infrastructure, which may be provided by one or multiple wireless communications systems, such as a wireless fidelity (WiFi) hotspot connected with the network 110 and/or a wireless carrier system that can be implemented using various data processing equipment, communication towers, etc.

The host systems 130 and 140 may each include a hypervisor (e.g., hypervisors 131 or 141) that are each associated with a virtual machine (e.g., virtual machine 132 and virtual machine 142). The host systems 130 or 140 may include, but are not limited to, desktop computers, laptop computers, rackmount servers, routers, switches, tablet computers, mobile phones, or any other type of computing device. The host systems 130 and 140 may include hardware resources that may include one or more processing devices, memory, and/or additional devices including, but not limited to, a graphics card, hardware RAID controller, network controller, hard disk drive, universal serial bus (USB) device, internal input/output (I/O) device, keyboard, mouse, speaker, etc. The hardware resources may be used to execute software, including one or more operating systems, virtual machines (e.g., a virtual machine based on a mobile communications device), or other applications.

The hardware resources of a host system may provide one or more services such as, but not limited to, networking services, storage services, and software libraries. In some embodiments, the hypervisor (e.g., hypervisor 131 or 141), also referred to as a virtual machine monitor (VMM) and/or a virtual machine (e.g., virtual machine 132 or 142), may use the one or more services that are provided by the host system. The hypervisors 131 or 141 is an application that executes on a host system 130 or 140 to manage virtual machines 132 or 142. In particular, the hypervisor may instantiate or start, migrate, pause, or perform another type of event associated with virtual machines 132 and 142. For example, the hypervisor 131 or 141 may perform a live merge operation for a virtual disk used by the virtual machine 132 or 142. In some embodiments, the hypervisor 131 or 141 may further coordinate metadata changes in the system architecture 100, such as creating and deleting virtual disk images, creating and merging snapshots within a volume chain 136, and copying images between storage domains. In some embodiments, the hypervisor 131 or 141 may update a series of volumes identified in a virtual disk image file that is stored at a shared storage 134. The hypervisor 131 or 141 may also update references for each of the volumes in the volume chain 136 that is associated with the disk image file that is stored at the shared storage 134. The shared storage 134 can include any number of storage devices that can be used by any number of hosts (e.g., hosts 130, 140).

The hypervisor 131 or 141 may include a virtualization API and a multi-platform emulator. Each virtual machine 132 and 142 may execute a guest operating system that can be accessed by a client system over the network 110. Each virtual machine 132 and 142 may further run guest applications using the guest operating system.

As shown in FIG. 1, the system architecture 100 may further include a management server 120. In some embodiments, the management server 120 may manage the use of the hardware resources of the host systems 130 and 140 as well as aspects of the storage servers 133 and the corresponding shared storage 134. The management server 120 may include a volume reference manager 121 that may determine references (e.g., paths, links) for each volume in a volume chain 136 associated with a virtual disk in the shared storage 134 as part of a live merge operation. For example, a hypervisor 131, 141 may perform a merge operation between two volumes on the virtual disk. In some embodiments, a live merge operation may refer to an operation performed on a virtual disk to change the series of volumes of the virtual disk as a virtual machine is writing or creating changes to the last volume of the virtual disk. For example, as previously described, the virtual disk may be based on a series of volumes (e.g., a first volume associated with the original virtual disk, a second volume associated with a first snapshot, a third volume associated with a second snapshot, a fourth volume associated with a third snapshot, etc.). A live merge operation may merge or combine two of the volumes in the series of volumes or the volume chain. For example, the second volume of the series of volumes (e.g., with the first snapshot) may be merged into the previous volume of the series of volumes (e.g., the original virtual disk) and the first snapshot may be deleted. The merging or combining of the volumes may result in the addition of the changed data that has been recorded in the second volume to the previous volume.

In operation, each of the hypervisor 131, 141 and the management server 120 may create and modify data that identifies the series of volumes upon which a virtual disk is based. For example, the hypervisor may manage the virtual disk file and a header of the virtual disk file may include information that identifies the series of volumes of the virtual disk. Further, the management server 120 may store metadata (e.g., data in another file stored at the same storage device as the virtual disk file) that also identifies the series of volumes associated with the virtual disk as well as the series of volumes associated with other virtual disks used by other hypervisors that manage other virtual machines. The header and/or metadata may also include references (e.g., paths, links) for each of the volumes. Each of the hypervisor and the management server may update its respective identification of the series of volumes of the virtual disk in response to a merge operation that is performed on the virtual disk while the virtual machine is currently writing data to the virtual disk (i.e., the live merge operation). For example, a virtual disk used by a virtual machine may be associated with a series of volumes including four volumes 'ABCD.' A live merge operation on the virtual disk may merge the volume C with the volume B. A successful live merge operation may result in the series of volumes of the virtual disk including AB'D where the volume B' includes data of volume B as well as data stored in volume C. The storage reference for volume D can be updated such that it is relative to the reference of the preceding volume (e.g., changed from referencing volume C to reference volume B).

In some embodiments, the reference to the virtual disk may change. As described, the volume chain can begin with the virtual disk and have any number of volumes. A new volume can have a storage reference that is relative to the storage reference of the volume that immediately precedes it. For example, a volume created after the virtual disk can have a storage reference that is relative to the storage reference of the virtual disk. A subsequently created volume can have a storage reference that is relative to the storage reference of the preceding volume. Thus, when the reference to the virtual disk changes, a virtual machine that uses any of the volumes in the volume chain can still continue to operate since the reference is relative to the storage reference of the virtual disk. By maintaining a relative reference after deleting a volume from the volume chain, a virtual machine that uses the virtual disk can be restarted or migrated on any host and can use any reference for the virtual disk.

Figure 2A:
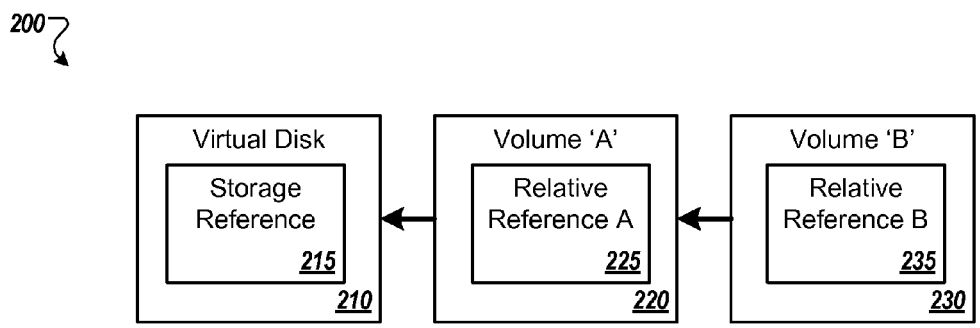
FIG. 2A is an illustrated example of a series of volumes with references to a shared storage in accordance with some embodiments of the disclosure.

FIG. 2A is an illustrated example of a series of volumes 200 with references to a shared storage in accordance with some embodiments of the disclosure. The series of volumes 200 may be referred to as a volume chain, as described herein. The volume chain 200 can include any number of volumes. As illustrated, the volume chain 200 includes a virtual disk 210, volume A 220 and volume B 230. A storage reference 215 can be associated with the virtual disk 210. The storage reference 215 can be a path that a virtual machine can use to access a shared storage using the virtual disk, as described herein. When a new volume is added to the volume chain, the reference for the new volume can be relative to the storage reference 215 of the virtual disk 210. For example, when volume A 220 is added to the volume chain 200, the relative reference 225 can be relative to the storage reference 215. In an example, the storage reference 215 can be represented by the path "/home/directory/volumes/volume_0.img" and the relative reference 225 can include a portion of the storage reference 215, such as "/volumes/volume_A.img." In some embodiments, the volumes are all stored in the same directory using a predetermined naming format. As in the example above, the volumes can be stored in the directory represented by "/home/directory/volumes." The volume chain 200 can also include a volume B 230 that has a reference (e.g., relative reference B 235) that is relative to the reference of volume A immediately preceding volume B.

Figure 2B:
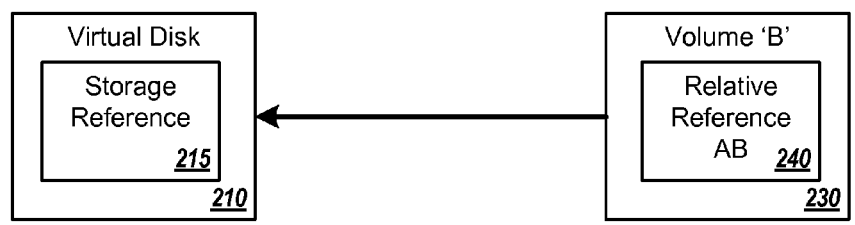
FIG. 2B is an illustrated example of the series of volumes with one of the volumes in the series having been removed in accordance with some embodiments of the disclosure.

FIG. 2B is an illustrated example of the series of volumes 200 with one of the volumes in the series having been removed in accordance with some embodiments of the disclosure. As illustrated, volume A 220 of FIG. 2A has been removed from the volume chain 200. Since the relative reference B 235 for volume B 230 was relative to the relative reference A 225 (which has been removed), the reference for volume B 230 is updated in view of both relative reference A 225 and relative reference B 235. Thus, volume B 230 has a new relative reference AB 240. In some embodiments, the volume reference manager 121 of FIG. 1 updates and manages the references for each of the volumes. For example, when updating the relative reference AB 240 for volume B 230, the volume reference manager 121 can use the relative reference B 235 to determine the relative reference A 225. Then, using the relative reference A 225, the volume reference manager 121 can determine the storage reference 215. The volume reference manager 121 can set the relative reference AB 240 to be relative to the storage reference 215.

Figure 3:
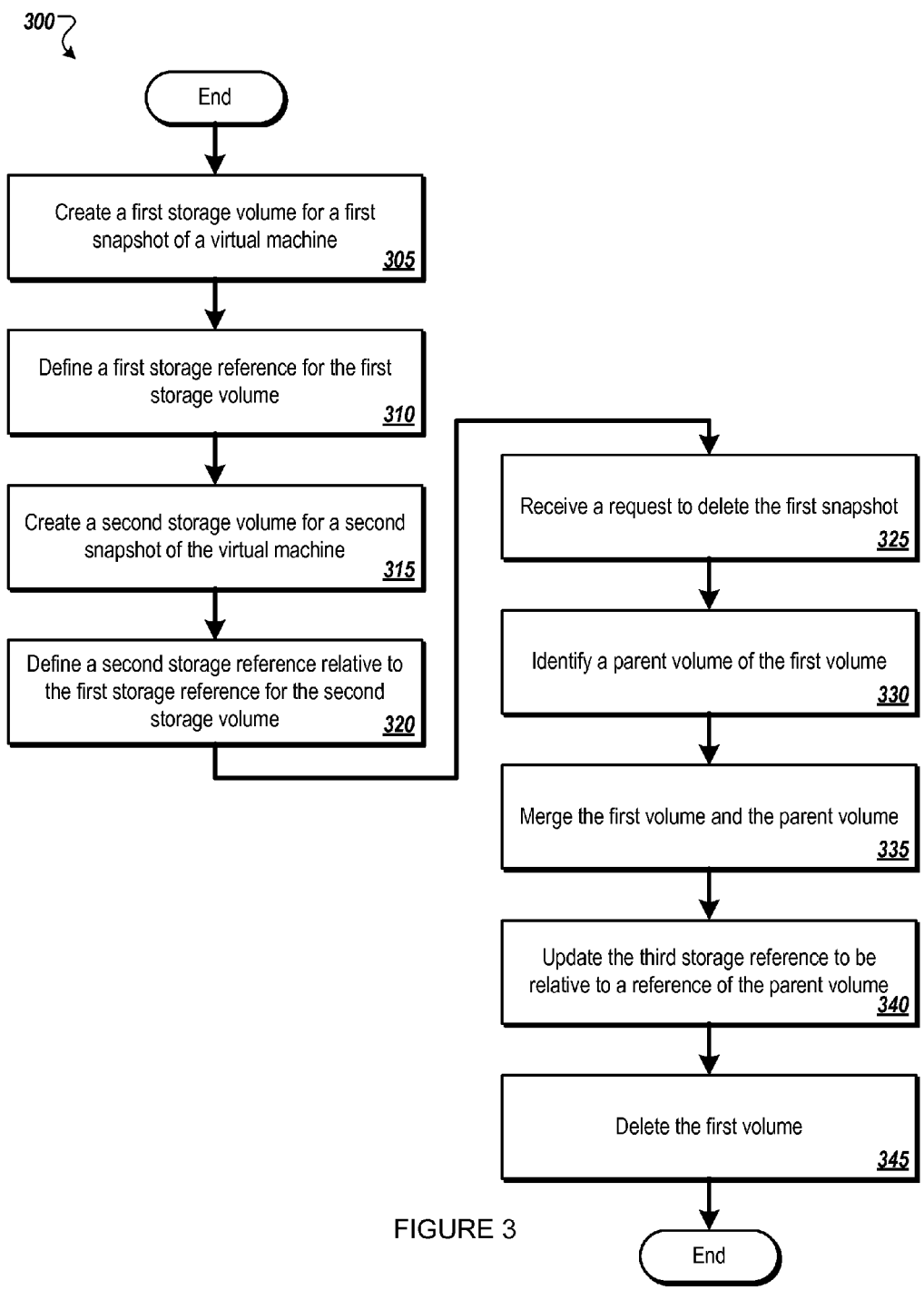
FIG. 3 is a flow diagram of an example method to maintain relative references when unlinking volumes from a volume chain in accordance with some embodiments.

FIG. 3 is a flow diagram of an example method 300 to maintain relative references when unlinking volumes from a volume chain of a virtual machine. The method 300 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 300 may be performed by a volume reference manager 121 of a management server 120 as described in conjunction with FIG. 1.

As shown, the method 300 may begin by the processing logic creating a first snapshot of a virtual machine at block 310. In some embodiments, the processing logic creates the first snapshot of the virtual machine in response to a user request to create a snapshot. The first snapshot can be associated with a first storage volume in a volume chain, as described herein. The processing logic defines a first storage reference for the first storage volume at block 310. The first storage reference can be a path to permit the virtual machine to access a shared storage, as described herein.

At block 315, the processing logic creates a second snapshot of the virtual machine and a second storage volume for the second snapshot. In some embodiments, the processing logic creates the second snapshot of the virtual machine in response to a user request to create the second snapshot. The processing logic defines a second storage reference for the second storage volume at block 320. The second storage reference can be a path to permit the virtual machine to access the shared storage. The second storage reference can be relative to the first storage reference, as described herein.

At block 325, the processing logic receives a request to delete the first snapshot. The request can be from a user or can be machine-generated, such as part of an operation to cleanup snapshots.

At block 330, the processing logic identifies a parent volume of the first volume associated with the first snapshot. In some embodiments, the processing logic identifies a volume chain to which the first volume and the second volume belong. The parent volume can also belong to the volume chain. The parent volume can have a third storage reference, which may be an absolute reference or a relative reference. In some embodiments, the parent volume is a virtual disk associated with the virtual machine. In other embodiments, the parent volume is a volume associated with another snapshot.

At block 335, the processing logic merges the first volume with the parent volume. In some embodiments, when merging the parent storage volume with the first storage volume, the processing logic performs a live merge operation to merge the first storage volume with the parent storage volume.

At block 340, the processing logic updates the second storage reference in view of the first reference while maintaining the second storage reference as a relative reference and not an absolute reference, as described herein. The parent volume is now the parent of the second volume. At block 345, the processing logic deletes the first volume.

Figure 4:
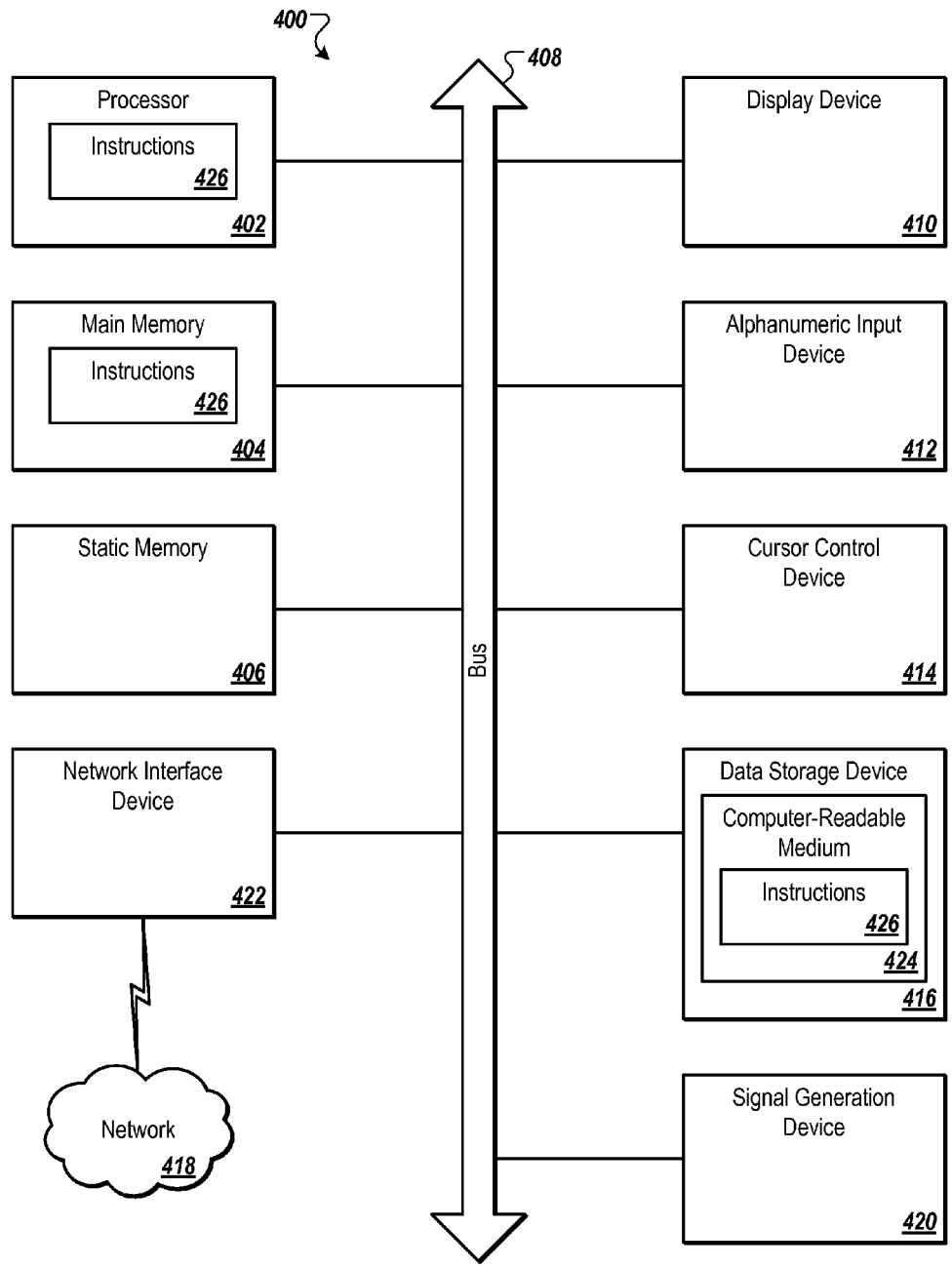
FIG. 4 illustrates a block diagram of an embodiment of a computer system in which some embodiments of the disclosure may operate.

FIG. 4 illustrates a diagrammatic representation of a machine in the example form of a computer system 400 within which a set of instructions, for causing the machine to perform any one or more of the methodologies discussed herein, may be executed. The computer system 400 may correspond to the management server 120 or host system 130, 140 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device), which communicate with each other via a bus 408.

The processing device 402 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 402 may therefore include multiple processors. The processing device 402 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like.

The computer system 400 may further include one or more network interface devices 422 (e.g., NICs). The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions 454 embodying any one or more of the methodologies or functions described herein (e.g., volume reference manager 121). The instructions 454 may also reside, completely or at least partially, within the main memory 404 and/or within the processing device 402 during execution thereof by the computer system 400; the main memory 404 and the processing device 402 also constituting machine-readable storage media.

While the computer-readable storage medium 424 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid-state memories, and optical and magnetic media.

The modules, components and other features described herein can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "probing", "establishing", "detecting", "modifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving a request to delete a snapshot of a virtual machine;
   identifying a volume chain in a shared storage that comprises the snapshot, the volume chain comprising a first storage volume, a second storage volume associated with the snapshot, and a third storage volume, the first storage volume comprising a first storage reference, the second storage volume comprising a second storage reference relative to the first storage reference, the third storage volume comprising a third storage reference relative to the second storage reference;
   performing a live merge operation to merge the second storage volume associated with the snapshot with the first storage volume preceding the second storage volume in the volume chain;
   generating, by a processor, a new storage reference associated with the third storage volume, the new storage reference to be relative to the first storage reference in view of the second storage reference and the third storage reference; and
   deleting the second storage volume associated with the snapshot.

2. The method of claim 1, wherein the volume chain comprises a second snapshot that is associated with the third storage volume.

3. The method of claim 1, wherein the first storage volume is associated with a virtual disk that is available to the virtual machine.

4. The method of claim 1 further comprising:
   creating the second storage volume in the shared storage in response to a first request to create the snapshot of the virtual machine; and
   defining the second storage reference for the second storage volume that is relative to the first storage reference.

5. The method of claim 4 further comprising:
   creating the third storage volume in the shared storage in response to a second request to create a second snapshot of the virtual machine; and
   defining the third reference for the third storage volume that is relative to the second reference.

6. The method of claim 1, wherein the second storage reference is relative to the first storage reference.

7. A system comprising:
   a memory; and
   a processing device operatively coupled with the memory to:
   receive a request to delete a snapshot of a virtual machine;
   identify a volume chain in a shared storage that comprises the snapshot, the volume chain comprising a first storage volume, a second storage volume associated with the snapshot and a third storage volume, the first storage volume comprising a first storage reference, the second storage volume comprising a second storage reference relative to the first storage reference, the third storage volume comprising a third storage reference relative to the second storage reference;
   delete the second storage volume associated with the snapshot, and
   perform a live merge operation to merge the second storage volume associated with the snapshot with the first storage volume preceding the second storage volume in the volume chain; and
   generate a new storage reference associated with the third storage volume, the new storage reference to be relative to the first storage reference in view of the second storage reference and the third storage reference.

8. The system of claim 7, wherein the volume chain comprises a second snapshot that is associated with the third storage volume.

9. The system of claim 7, wherein the first storage volume is associated with a virtual disk that is available to the virtual machine, the processing device further to update the third storage reference to be relative to the first storage reference in view of the second storage reference.

10. The system of claim 7, the processing device further to:
    create the second storage volume in the shared storage in response to a first request to create the snapshot of the virtual machine; and
    define the second storage reference for the second storage volume that is relative to the first storage reference.

11. The system of claim 10, the processing device further to:
    create the third storage volume in the shared storage in response to a second request to create a second snapshot of the virtual machine; and
    define the third reference for the third storage volume that is relative to the second reference.

12. The system of claim 7, wherein the second storage reference is relative to the first storage reference.

13. A non-transitory machine-readable storage medium including data that, when accessed by a processing device, cause the processing device to:
    receive a request to delete a snapshot of a virtual machine;
    identify a volume chain in a shared storage that comprises the snapshot, the volume chain comprising a first storage volume, a second storage volume associated with the snapshot, and a third storage volume, the first storage volume comprising a first storage reference, the second storage volume comprising a second storage reference relative to the first storage reference, the third storage volume comprising a third storage reference relative to the second storage reference;

perform a live merge operation to merge the second storage volume associated with the snapshot with the first storage volume preceding the second storage volume in the volume chain;

generate, by the processing device, a new storage reference associated with the third storage volume, the new storage reference to be relative to the first storage reference in view of the second storage reference and the third storage reference; and delete the second storage volume associated with the snapshot.

14. The non-transitory machine-readable storage medium of claim 13, wherein the volume chain comprises a second snapshot that is associated with the third storage volume.

15. The non-transitory machine-readable storage medium of claim 13, wherein the first storage volume is associated with a virtual disk that is available to the virtual machine.

16. The non-transitory machine-readable storage medium of claim 13, the data to cause the processing device further to:

create the second storage volume in the shared storage in response to a first request to create the snapshot of the virtual machine; and define the second storage reference for the second storage volume that is relative to the first storage reference.

17. The non-transitory machine-readable storage medium of claim 16, the data to cause the processing device further to:

create the third storage volume in the shared storage in response to a second request to create a second snapshot of the virtual machine; and define the third reference for the third storage volume that is relative to the second reference.

* * * * *